United States Patent [19]

Matheson et al.

[11] 4,129,542

[45] Dec. 12, 1978

[54] THERMOPLASTIC ELASTOMERIC BLEND OF RUBBER AND BITUMINOUS MATERIAL

[75] Inventors: Alister F. Matheson, Wilmslow, England; Douglas J. Tosh, Sarnia; Mitchell Borr, Guelph, both of Canada

[73] Assignee: Uniroyal Ltd., Montreal, Canada

[21] Appl. No.: 655,593

[22] Filed: Feb. 5, 1976

Related U.S. Application Data

[63] Continuation of Ser. No. 417,701, Nov. 20, 1973, abandoned.

[30] Foreign Application Priority Data

Nov. 14, 1973 [CA] Canada ................................. 185784

[51] Int. Cl.$^2$ .............................................. C08L 95/00
[52] U.S. Cl. ............................................... 260/28.5 AS
[58] Field of Search ..................... 260/28.5 B, 28.5 AS

[56] References Cited

U.S. PATENT DOCUMENTS

| 3,265,765 | 8/1966 | Holden | 260/28.5 AS |
|---|---|---|---|
| 3,751,389 | 8/1973 | Hotta | 260/28.5 B |
| 3,758,643 | 9/1973 | Fischer | 260/897 A |
| 3,803,066 | 4/1974 | Petrossi | 260/28.5 AS |
| 3,806,558 | 4/1974 | Fischer | 260/897 A |
| 3,833,528 | 9/1974 | Behling | 260/28.5 B |
| 3,853,799 | 12/1974 | Behling | 260/28.5 AS |
| 3,873,483 | 3/1975 | Oelsner | 260/28.5 AS |
| 3,963,659 | 6/1976 | Binder | 260/28.5 AS |

FOREIGN PATENT DOCUMENTS 875947  8/1961  United Kingdom.

Primary Examiner—Paul R. Michl
Attorney, Agent, or Firm—James J. Long

[57] ABSTRACT

A novel thermoplastic, elastomeric material is obtained by curing under shear conditions (e.g. in a high shear internal mixer) a blend of vulcanizable rubber (e.g. SBR, EPDM) and a bituminous material (e.g., asphalt) in the presence of a rubber vulcanizing agent (e.g. sulfur or peroxide). The product has a unique combination of elastomeric and thermoplastic properties. It can be processed by conventional thermoplastic methods at elevated temperatures (e.g. extrusion, calendering, vacuum forming) and at normal temperatures possesses good elastomeric properties without the need for subsequent vulcanization. If desired, the material can be reprocessed.

1 Claim, No Drawings

THERMOPLASTIC ELASTOMERIC BLEND OF RUBBER AND BITUMINOUS MATERIAL

This is a continuation of application Ser. No. 417,701 filed Nov. 20, 1973, now abandoned.

This invention relates to a thermoplastic elastomer and method of making same.

The present invention is based on the discovery that the dynamic cure of a blend of a rubber, a bituminous material and optionally filler, mixed with a small amount of a rubber vulcanizing agent, will result in a novel material with a highly desirable combination of thermoplastic and elastomeric properties. A dynamic cure is one in which shear as well as heat are applied to the reaction mixture. This is readily achieved in standard rubber processing equipment, such as an internal mixer (e.g. Banbury, Intermix or Transfermix [trademarks]) or rubber mill. The resulting product softens and at elevated temperatures can be processed by standard methods used for thermoplastics, e.g. extrusion, injection molding, calendering, into a wide range of shaped articles which, without further cure or vulcanization, exhibit good rubberlike qualities (i.e. exhibiting some resilience and recovery after relatively large deformation) comparable to those of conventional thermoplastics, any scrap can be readily re-processed, with retention of physical properties.

The composition comprises a vulcanizable rubber, a bituminous material which is solid at room temperature but which softens at elevated temperatures, optionally a filler material, and a rubber vulcanization system. The process for producing the product involves two stages. In the first stage the rubber, bitumimous material, fillers and any other optional ingredients, other than the curatives, are added to the mixer and masticated to a homogenous blend. After blending of the above ingredients is complete, the vulcanizing agents are added in the second stage and the batch is further mixed at an elevated temperature, during which the curing reactions take place. During both stages the mixing must be done under shear conditions in order to obtain effective mixing of the ingredients and to yield a product with desired properties.

The process conditions are governed by the type of rubber and bituminous material and the type of vulcanizing system employed in the specific composition and also on kind, size and efficiency of the shear mixer employed. In the first stage (before the addition of curative) the objective is simply to achieve an intimately mixed blend of the ingredients. It was found that in an internal mixer, such as a banbury, good mixing was obtained at a temperature above about 250° (all temperatures are expressed herein in degrees Farenheit, unless otherwise indicated), for a period less than about 10 minutes. In the second stage the aim is to obtain efficient blending of the curatives as well as to effect the vulcanization reactions, ordinarily at a temperature between about 200° and 450°, for 4-30 minutes. Employing sulfur as the curative, in an internal mixer such as a banbury, the temperature during the mixing may be between about 250° and 450°. Best results have been obtained when the temperature is in the range from about 300° to 400°. The duration of mixing is generally under about 15 minutes (e.g. 5-15 minutes). When a peroxide (e.g. dicumyl peroxide) is used as the curative, the temperature may be in the range 200° to 350°, preferably 250° to 280° and the time of mixing is generally less than about 20 minutes (e.g. 5-15 minutes).

Suitable rubbers are vulcanizable rubbers containing unsaturation which can be cured by conventional sulfur or peroxide type curing systems. Examples are the conjugated diolefin polymer rubbers. Whether homopolymers or copolymers, such as polymers of butadiene, isoprene, chloroprene, etc., as exemplified by polybutadiene, polyisoprene (natural or synthetic), butadiene-styrene copolymer, butadiene-styrene copolymer, butadiene-acrylonitrile copolymer, butadiene-vinyl-pyridine copolymer, isoprene-isobutylene copolymer, and the like, whether made by solution polymerization or emulsion polymerization methods, stereo-specific or otherwise. Also suitable are the unsaturated olefin terpolymer rubbers which may be defined as terpolymers of ethylene with an alpha-olefin of the formula $RCH=CH_2$, where R is an alkyl radical having 1 to 6 carbon atoms, and a copolymerizable non-conjugated diene (e.g., dicyclopentadiene, methylene norbornene, ethylidene norbornene, etc.), notably ethylene-propylene-non-conjugated diene terpolymer rubber (EPDM). In certain cases it may be desirable to use blends of more than one rubber.

The generic term, bituminous materials, incorporates bitumen, asphalt, tar and pitch. Bitumen is defined as the solid residue obtained from distillation of various organic raw materials, asphalt as predominantly bitumens which occur in nature or as residues from petroleum refining, tars as viscous liquids obtained as the condensate in the destructive distillation of coal, petroleum, wood, etc., and pitch as the residue remaining after removal of the tar. Asphalts are plastic in that they can be molded. Though high in molecular weight, they have many structurally dissimilar units and therefore do not fit the usual definition of polymer. Chemically they are complex mixtures which may be separated into three major fractions: asphaltenes, resins and oils. A common asphaltic modification is that of air blowing. Blown asphalts contain more asphaltenes than the straight run asphalts.

Preferred bituminous materials are the asphalts which are solid at room temperature and which have a softening point above about 150° as measured by the standard ring and ball method (ASTM D-36-70).

In general, about 100 to 400 parts, preferably about 125 to 250 parts, of bituminous material such as asphalt or blend of asphalts per 100 parts of rubber, may be used.

The vulcanizing agents employed are sulfur type or organic peroxide type curatives conventionally used to cure rubbers. The amounts employed are in the range normally used with these rubbers. Best results have been obtained with sulfur curing systems. With sulfur or sulfur donor curatives the conventional auxiliary agents, such as accelerators and activators, are added. If desired, mixed peroxide or sulfur curatives may be used. It is believed that the vulcanizing agents employed, particularly in the case of sulfur curatives, react with the asphalt component as well as the rubber to provide superior properties. For a detailed listing of sulfur-type and peroxide-type curatives for rubbers reference may be had to copending application Ser. No. 171,328 of Fischer, filed Aug. 12, 1971 (now U.S. Pat. No. 3,806,558, Apr. 23, 1974) the disclosure of which is hereby incorporated herein by reference, as well as Encyclopedia of Chemical Technology, Vol. 17, 2nd edition. Interscience Publishers, 1968, and Organic Peroxides, Daniel Severn. Vol. 1, Wiley-Interscience, 1970. Reference may also be had to "Vulcanization and Vulcanizing Agents", W. Hoffman, Palmerton Publishing Co., New York, 1967, for an extensive disclosure of sulfur curing systems and organic peroxide curing systems for rubbers.

In addition to the above-described essential ingredients (rubber, bituminous material and curative system), optional ingredients of the type commonly added in conventional rubber and asphalt compounding may be incorporated in the composition of the invention. Reinforcing fillers such as carbon black and silica are desirable. Mineral fillers such as calcium carbonate or clay may be used. Fibrous materials such as asbestos or separated reclaim tire fiber may be included to reinforce the product or reduce the material cost. Plasticizers, in particular petroleum oils, are compounding ingredients useful in modifying the properties of the product. The addition of small amounts of thermoplastic resins, such as polyethylene or polypropylene, has a beneficial effect on strength properties.

The products of this invention offer the advantages of elastomeric properties combined with thermoplastic processability at low cost. Because of the ability of the material to be sealed, both to itself and to other substrates, by the application of heat and pressure, the material is useful in such areas as waterproofing membrane, roofing and liners for reservoirs and canals.

The following examples will serve to illustrate the practice of the invention in more detail.

EXAMPLE 1

This Example is included to show the effect of a dynamic cure compared to a press cure and to demonstrate the difference between the instant invention and the disclosure of British Pat. No. 1,160,547, Bowman, Aug. 6, 1969.

The formulation of Example No. 1 from the patent was tested after (a) no cure, (b) press cure as in the patent and (c) dynamic cure as in this invention. Three quite different end products were obtained, but only that produced by method (c) had both rubbery and thermoplastic properties.

| Formulation: | Parts by Weight |
|---|---|
| SBR rubber | 100 |
| Asphalt | 150 |
| Sulfur | 2.9 |
| Benzothiazyl disulfide | 3.9 |
| Tetramethylthiuram disulfide | 1.0 |

(a) The rubber was polysar Krylene (trademark) 1500, having a styrene content of 23.5% by weight and a Mooney viscosity of 52, ML-4-212°. The asphalt was a petroleum asphalt having a softening point of 248°. The batch size was 350 g. The ingredients were mixed in a water-cooled laboratory banbury (approximately 0.716. capacity) for 5 minutes, keeping the stock temperature below 150°. The product was discharged and was found to be extremely tacky and difficult to handle. However a sample was sheeted out on a mill and tensile properties measured on ASTM die cut samples
 Tensile strength; 10 psi
 Elongation at break; 150%

(b) The ingredients without sulfur were mixed in the laboratory banbury for 20 minutes at 248°, followed by milling with the sulfur at 285° for 10 minutes. The blend was then sheeted from a laboratory mill and press molded at 550 psi. for 15 minutes at 300°. Tensile properties were measured on ASTM die cut samples from the press molded sheet.
 Tensile strength; 316 psi.
 Elongation of break; 950%

The cured product could not be reprocessed and when subjected to shear on the mill did not band but broke down to a very rough sheet.

(c) The ingredients, without curatives, were mixed in the laboratory banbury for 20 minutes at 280°. The curatives were then added to the mix in the banbury and mixing was continued for 15 minutes at 330°-350°. After discharge from the banbury, the product was found to be easy to handle and could be readily milled into a smooth sheet at 280°. Tensile properties were measured on ASTM die cut samples from the milled sheet.
 Tensile strength; 149 psi.
 Elongation at break; 230%

The above product could be reprocessed on the mill, with no loss in properties.

Example 2

This Example illustrates the use of EPDM rubber in the practice of the invention.

| Formulation: | Parts by Weight |
|---|---|
| EPDM | 100 |
| Asphalt | 150 |
| Carbon black | 60 |
| Sulfur | 1.8 |
| 2-Mercaptobenzothiazole | 0.5 |
| Tetramethylthiuram disulfide | 1.0 |
| Zinc oxide | 5.0 |

The EPDM rubber is exemplified by a terpolymer of ethylene, propylene (68:32 weight ratio) and ethylidene norbornene, iodine number 10, containing 40 parts paraffinic petroleum hydrocarbon extender oil per 60 parts polymer. The asphalt employed was a petroleum asphalt having a softening point of 340°. The carbon black was of the SAF type. The batch size was 350 g. The rubber, asphalt and carbon black were blended in a steam heated laboratory banbury (approximately 0.7 lb capacity) at 100 rpm. for 5 minutes. The temperature rose from 250° at the start to 285° at 5 minutes. At this time the curatives were added and mixing was continued for a further 15 minutes. At the end of this time the temperature was 318°. The product was discharged and sheeted out on a mill at 350°.

Various test samples were prepared from the milled sheet by press molding at 350°-380°. The physical properties are shown in TABLE I. The material has good low temperature flexibility at temperatures as low as −10°. An indication of the low temperature flexibility was obtained by determining the lowest temperature at which all of 3 press-molded specimens (3.5 × 1.0 × 0.060) could be bent 180° without cracking, after 30 minutes conditioning at that temperature.

EXAMPLE 3

This Example illustrates the use of SBR rubber and shows the kind of properties which can be obtained without fillers or other additives.

| Formulation: | Parts by Weight |
|---|---|
| SBR | 100 |

| Formulation: | Parts by Weight |
| --- | --- |
| Asphalt | 150 |
| Sulfur | 2.5 |
| Benzothiazyl disulfide | 2.0 |
| Zinc oxide | 5.3 |
| Stearic acid | 1.6 |

The SBR rubber was the same as in Example 1. The asphalt had a softening point of 340°. The batch size was 350 g. The rubber and asphalt were mixed in a steam-heated laboratory banbury at 100 rpm. for 5 minutes. The temperature rose from 300° at 0 minutes to 320° at 5 minutes. The remaining ingredients were added and mixing was continued for 18 minutes longer, at which time the temperature of the batch was 352°. The product was dumped and sheeted on a laboratory rubber mill heated to 380°. Test specimens were molded from the milled sheet in a press at 350°–380°. Physical test data are given in TABLE I. The material had good low temperature flexibility at temperatures as low as −27°, as determined by the test described in Example 2.

EXAMPLE 4

This Example illustrates the use of SBR rubber, a higher proportion of asphalt of a lower softening point than employed in Example 3, and a combination of fillers.

| Formulation: | Parts by Weight |
| --- | --- |
| SBR | 100 |
| Asphalt | 200 |
| Carbon black | 90 |
| Silica | 86 |
| Sulfur | 2.5 |
| MBTS | 2.0 |
| Zinc oxide | 5.3 |
| Stearic acid | 1.6 |

The SBR rubber was the same as in Example 1. The asphalt was a petroleum asphalt having a softening point of 220° F. The carbon black was of the MT type. The silica was a precipitated hydrated silica. The batch size was 25 lbs. The batch was processed in a water-cooled banbury of approximately 27 lb. capacity at 100 rpm. The mixing cycle was as follows:

| | Time in Cycle | Batch Temperature |
| --- | --- | --- |
| Rubber, asphalt and fillers added | 0 min. | 75° |
| Remaining ingredients added | 10 min. | 315° |
| Batch discharged | 20 min. | 350° |

The product was dumped onto a sheeter mill at 180° and the sheeted product calendered to a sheet 0.080 in. thickness on a 3-roll calender (roll temperature 180°). The physical test results are shown in TABLE I and were carried out on the calendered sheet, with the test specimens cut longitudinally to the direction of calendering.

EXAMPLE 5

This Example illustrates the practice of the invention employing SBR rubber, a mixture of two different asphalts, particulate fillers and the addition of a cheap fibrous filler, e.g., separated tire fiber from the reclaiming of scrap tires.

| Formulation: | Parts by Weight |
| --- | --- |
| SBR | 100 |
| Asphalt A | 100 |
| Asphalt B | 100 |
| Carbon black | 120 |
| Silica | 60 |
| Fiber | 20 |
| Sulfur | 2.6 |
| MBTS | 2.0 |
| Zinc oxide | 5.8 |
| Stearic acid | 1.8 |

The SBR was as in Example 1. Asphalt A had a softening point of 340°; asphalt B had a softening point of 220°. The carbon black was of the MT type. The silica was a precipitated hydrated silica. The fiber was separated reclaim tire fiber. The batch size was 25.6 lbs. The processing was carried out in a manner similar to that described in Example 4, except that at the 4-minute point in the cycle the rotor speed was changed 20 rpm. The mixing cycle was as follows:

| | Time in Cycle | Batch Temperature |
| --- | --- | --- |
| Rubber, asphalt and fillers added | 0 min. | 75° |
| Curatives added | 9 min. | 340° |
| Dump | 18 min. | 350° |

The product was sheeted on a mill at 180° and calendered on a 3-roll calender at 180°. The physical test results, obtained on test specimens cut from the 0.080 in. sheet parallel to the direction of calendering, are given in TABLE I.

EXAMPLE 6

This Example further illustrates a typical low cost formulation based on SBR rubber, the ingredients being as identified in Example 5, batch size 22.1 lbs.

| Formulation | Parts by Weight |
| --- | --- |
| SBR | 100 |
| Asphalt A | 25 |
| Asphalt B | 200 |
| Carbon black | 120 |
| Silica | 85 |
| Fiber | 10 |
| Sulfur | 2.5 |
| MBTS | 2.0 |
| Zinc oxide | 5.3 |
| Stearic acid | 1.5 |

The procedure was similar to that described in Example 4. The following banbury mixing cycle was used:

| | Time in Cycle | Batch Temperature |
| --- | --- | --- |
| Rubber, asphalt and fillers added | 0 min. | 74° |
| Curatives added | 9.5 min. | 350° |
| Discharge | 15 min. | 370° |

Physical test results are given in TABLE I. The material exhibits good low temperature flexibility at temperatures as low as −5°, as determined by the test described in Example 2.

EXAMPLE 7

This Example illustrates the use of peroxide as the vulcanization ingredient in the composition of this invention, using the same SBR as in Example 1 and asphalt having a softening point of 248°. The batch size was 70 g.

| Formulation: | Parts by Weight |
|---|---|
| SBR | 100 |
| Asphalt | 200 |
| Silica | 150 |
| Dicumyl peroxide | 3.0 |

The rubber, asphalt and filler were mixed in a Brabender Plasi-Corder (trademark) equipped with a high shear internal mixing head with cam type blades (about 85 ml. capacity), at 250° at 60 rpm. for 5 minutes. The peroxide was added and mixing at 250° was continued for 15 minutes. The product was discharged and sheeted out on a laboratory rubber mill at 220°. Tensile properties (shown in TABLE I) were measured on die cut samples from the milled sheet. The material could be readily reprocessed on the mill.

In TABLE I, H stands for Shore A hardness (ASTM D-2240), Sp. Gr. stands for specific gravity (D-471). TS stands for tensile strength expressed in psi, E for elongation at break expressed in percent, M for 100% modulus expressed in psi and S stands for 75% extension set expressed in percent, all determined according to ASTM D-412. The tensile testing at elevated temperature was done using a crosshead speed of 10 inches per minute. Data prefixed with the symbol > indicate that the specimens were extended to the limit of the environmental chamber of the Instron (trademark) testing machine without breaking. CSB-RT stands for compression set B, measured after 22 hours at room temperature, expressed in percent, CSB-158 stands for a similar measurement after 22 hours at 158° (D-355). BR stands for Bashore resilience (D-2632) while T stands for die C tear, expressed in pounds per linear inch (D-624).

TABLE I

| | PHYSICAL PROPERTIES | | | | | |
|---|---|---|---|---|---|---|
| | Ex. 2 | Ex. 3 | Ex. 4 | Ex. 5 | Ex. 6 | Ex. 7 |
| H | 83 | 67 | | | 81 | |
| Sp. Gr. | 1.1 | 1.1 | | | | |
| Rm.Temp. | | | | | | |
| TS | 620 | 450 | 282 | 405 | 300 | 270 |
| E | 600 | 590 | 268 | 135 | 250 | 140 |
| M | 239 | 136 | | | 180 | 240 |
| S | 22 | 15 | | | | |
| 50° C. | | | | | | |
| TS | >185 | 171 | | | 250 | |
| E | >500 | 380 | | | 215 | |
| M | 107 | 81 | | | 150 | |
| 75° C. | | | | | | |
| TS | > 98 | 93 | | | 190 | |
| E | >500 | 320 | | | 210 | |
| M | 57 | 44 | | | 115 | |
| 100° C. | | | | | | |
| TS | 78 | 70 | | | 125 | |
| E | 435 | 265 | | | 190 | |
| M | 37 | 38 | | | 70 | |
| CSB-RT | 47 | 50 | | | 56 | |
| CSB-158 | 67 | 67 | | | | |
| PR | 23 | 23 | | | 16 | |
| T | 143 | 152 | 78 | 104 | 90 | |

We claim:

1. A method of converting into a thermoplastic elastomer an unsaturated vulcanizable rubber comprising providing an intimately mixed blend of (A) 100 parts by weight of said unsaturated vulcanizable rubber with (B) from 125 to 250 parts by weight of bituminous material by masticating the said unsaturated vulcanizable rubber and bituminous material together at elevated temperature, and further masticating said intimately mixed blend under dynamic shearing conditions in an internal mixer in the presence of (C) a curative for said unsaturated vulcanizable rubber in amount sufficient to cure the rubber, the said dynamic shearing of the intimately mixed blend in the presence of the curative being continued for a time and at a temperature sufficient to dynamically cure the rubber, whereby the bend is converted into a thermoplastic elastomer which is characterized by the ability to be thermoformed thereafter without cure into useful shaped articles having elastomeric properties, and by the ability to be re-processed, the said rubber (A) being ethylene-propylene-non-conjugated diene terpolymer.

* * * * *